「US008072658B2」

United States Patent
Namikata

(10) Patent No.: US 8,072,658 B2
(45) Date of Patent: Dec. 6, 2011

(54) IMAGE PROCESSING APPARATUS AND ITS METHOD

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 11/175,217

(22) Filed: Jul. 7, 2005

(65) Prior Publication Data

US 2006/0007457 A1     Jan. 12, 2006

(30) Foreign Application Priority Data

Jul. 7, 2004   (JP) ................................. 2004-200800

(51) Int. Cl.
G03F 3/08     (2006.01)
(52) U.S. Cl. ......... 358/518; 358/1.9; 358/504; 358/523; 382/162; 382/167
(58) Field of Classification Search .................. 358/1.9, 358/523; 382/162, 167
See application file for complete search history.

(56) References Cited

U.S. PATENT DOCUMENTS

| | | | | |
|---|---|---|---|---|
| 5,432,893 A | * | 7/1995 | Blasubramanian et al. .. | 345/600 |
| 5,835,624 A | * | 11/1998 | Ueda et al. .................... | 382/162 |
| 6,027,201 A | * | 2/2000 | Edge ............................. | 347/19 |
| 6,075,888 A | * | 6/2000 | Schwartz ..................... | 382/167 |
| 2001/0030777 A1 | * | 10/2001 | Tamagawa ................... | 358/518 |
| 2002/0031258 A1 | | 3/2002 | Namikata .................... | 382/165 |
| 2002/0039106 A1 | * | 4/2002 | Shimada ...................... | 345/604 |
| 2002/0060797 A1 | | 5/2002 | Namikata .................... | 358/1.9 |
| 2002/0145744 A1 | * | 10/2002 | Kumada et al. .............. | 358/1.9 |
| 2003/0133138 A1 | | 7/2003 | Hamikata .................... | 358/1.9 |
| 2003/0193688 A1 | | 10/2003 | Namikata .................... | 358/1.5 |
| 2004/0126009 A1 | * | 7/2004 | Takenaka et al. ............ | 382/162 |
| 2004/0130739 A1 | * | 7/2004 | Adam et al. .................. | 358/1.9 |
| 2004/0223173 A1 | * | 11/2004 | Arai .............................. | 358/1.9 |
| 2004/0263876 A1 | * | 12/2004 | Chang .......................... | 358/1.9 |
| 2005/0018226 A1 | * | 1/2005 | Chiba ........................... | 358/1.9 |
| 2005/0128495 A1 | * | 6/2005 | Arai .............................. | 358/1.9 |
| 2005/0128498 A1 | | 6/2005 | Matsuzaki ................... | 358/1.9 |
| 2005/0179915 A1 | * | 8/2005 | Tsukada ....................... | 358/1.9 |
| 2005/0195212 A1 | * | 9/2005 | Kurumisawa et al. ....... | 345/604 |
| 2005/0195415 A1 | * | 9/2005 | De Baer ....................... | 358/1.9 |

FOREIGN PATENT DOCUMENTS

| | | |
|---|---|---|
| JP | 10250153 A | 9/1998 |
| JP | 2003298862 A | 10/2003 |

OTHER PUBLICATIONS

Office Action, dated Feb. 6, 2009, in JP 2004-200800.

* cited by examiner

*Primary Examiner* — Sudhanshu Pathak
*Assistant Examiner* — Miya J Cato
(74) *Attorney, Agent, or Firm* — Fitzpatrick, Cella, Harper & Scinto

(57) ABSTRACT

Since many ICC profile generation tools print and measure a large number of color patches and then make profile generation calculations, profile re-generation requires a long time. Hence, patch data are generated, calorimetric values corresponding to the patch data are obtained. Reference values of an Lab color space, which correspond to the patch data, are calculated using a conversion lookup table from a CMYK color space to the Lab color space, which is included in a profile. A conversion lookup table from the Lab color space to the CMYK color space, which is included in the profile, is updated using the calorimetric values and reference values.

16 Claims, 17 Drawing Sheets

FIG. 2A

| CMYK → L*a*b* | | | | | | | |
|---|---|---|---|---|---|---|---|
| C | M | Y | K | L* | a* | b* |
| 100 | 100 | 100 | 0 | → | 50 | 0 | 0 |
| 200 | 100 | 100 | 0 | → | 50 | -10 | -10 |
| ⋮ | | | | | ⋮ | | |

FIG. 2B

| L*a*b* → CMYK | | | | | | | |
|---|---|---|---|---|---|---|---|
| L* | a* | b* | C | M | Y | K |
| 50 | 0 | -10 | → | 120 | 100 | 75 | 50 |
| 50 | 0 | 0 | → | 120 | 100 | 100 | 50 |
| | ⋮ | | | | ⋮ | | |

● ······ Lab GRID POINTS OF Lab → CMYK LUT

× ······ Lab GRID POINTS FOR PATCH DATA GENERATION

IMAGE PROCESSING APPARATUS AND ITS METHOD

FIELD OF THE INVENTION

The present invention relates to an image processing apparatus and its method and, more specifically, to color management.

BACKGROUND OF THE INVENTION

In recent years, color devices such as monitors, printers, and the like have prevailed, and the color management technique that manages color information is increasing in importance. Since display devices such as monitors and the like have different color gamuts from output devices such as printers and the like, color information of display devices cannot be handled as that of output devices intact. Hence, a color management system (to be referred to as a "CMS" hereinafter) becomes important. This system temporarily converts color information of an image input device into that in the absolute color space, and then converts the information in the absolute color space into that in a color space of an image output device, so as to convert and output color data of the image input device into color data that can be reproduced by the image output device.

FIG. 1 is a chart showing the flow of the processes of the CMS executed when an image input by an input device is to be output by an output device.

An input color space 201 which depends on an input device such as a digital camera, scanner, or the like is converted into an absolute color space 203 by a source profile 202. The absolute color space 203 is converted into an output color space 205, which depends on an output device, by a destination profile 204. Note that the source profile 202 is used to convert the input color space into the absolute color space, and the destination profile 204 is used to convert the absolute color space into the output color space. As these profiles, ICC profiles as the format specified by International Color Consortium (ICC) are popularly used nowadays.

FIGS. 2A and 2B show an example of the data expression formats of ICC profiles. Profiles used in a printer often expresses color space conversions using lookup tables (to be referred to as "LUTs" hereinafter), as shown in FIGS. 2A and 2B. FIG. 2A shows an LUT used to convert device-dependent CMYK data into device-independent Lab data, and FIG. 2B shows an LUT used to convert device-independent Lab data into device-dependent CMYK data.

The ICC profiles are normally distributed upon delivery of products of devices, or are installed in devices. However, every devices inevitably suffer characteristic variations due to aging, and default ICC profiles are not always optimal to devices whose characteristics have varied. Also, even when identical profiles are used in identical devices, images with the same tint are not always obtained depending on individual differences of the devices. A state wherein a plurality of devices have different tints especially poses a problem in a cluster printer environment in which identical images are distributed to and output by a plurality of printers. This is because when identical images are output using printers of the same type, images with the same tint are expected to be obtained.

In order to cope with such problems of aging and individual differences of devices, when ICC profiles are re-generated at a given timing or for each individual device, optimal color reproduction can be obtained at that timing or for that device.

However, many ICC profile generation tools print and measure a large number of color patches (in general, about 1,000 patches) and then make profile generation calculations. Hence, profile re-generation requires a long time. Furthermore, when a series of operations, i.e., print, colorimetry, and calculations are made in correspondence with a plurality of devices, a longer time is required. For this reason, it is difficult for devices whose device characteristics readily vary day by day such as electrophotographic color printers and the like to routinely re-generate profiles.

SUMMARY OF THE INVENTION

According to the first aspect of the present invention, there is disclosed an image processing to generate a profile used to convert image data of an input color space into image data of an output color space via an absolute color space, which generates patch data including multi-order colors, obtains colorimetric values corresponding to the patch data, calculates reference values of the absolute color space corresponding to the patch data using first conversion data from the output color space to the absolute color space, which is included in the profile, and updates second conversion data from the absolute color space to the output color space, which is included in the profile, using the calorimetric values and the reference values, wherein the generation converts color values included in a color gamut of a predetermined device of the generated color values.

According to the second aspect of the present invention, there is disclosed an image processing, which generates patch data including multi-order colors, obtains colorimetric data corresponding to the patch data, calculates a reference value of an absolute color space corresponding to the patch data, updates conversion data from the absolute color space to an output color space using the calorimetric data and the reference value, wherein the generation generates the patch data in accordance with color values uniformly distributed in the absolute color space.

According to the present invention, profiles can be easily adjusted. Also, profiles can be adjusted using a relatively small number of patches.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A and 2B show an example of the data expression formats of ICC profiles;

DESCRIPTION OF THE PREFERRED EMBODIMENTS

The image processing according to preferred embodiments of the present invention will be described in detail hereinafter.

First Embodiment

[Arrangement]

Figure 1:
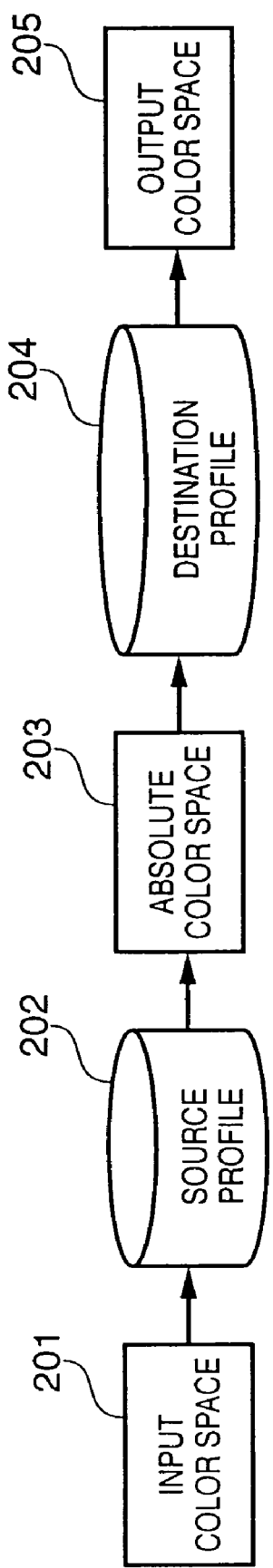
FIG. 1 is a chart showing the flow of the processes of a CMS executed when an image input by an input device is to be output by an output device.
Figure 3:
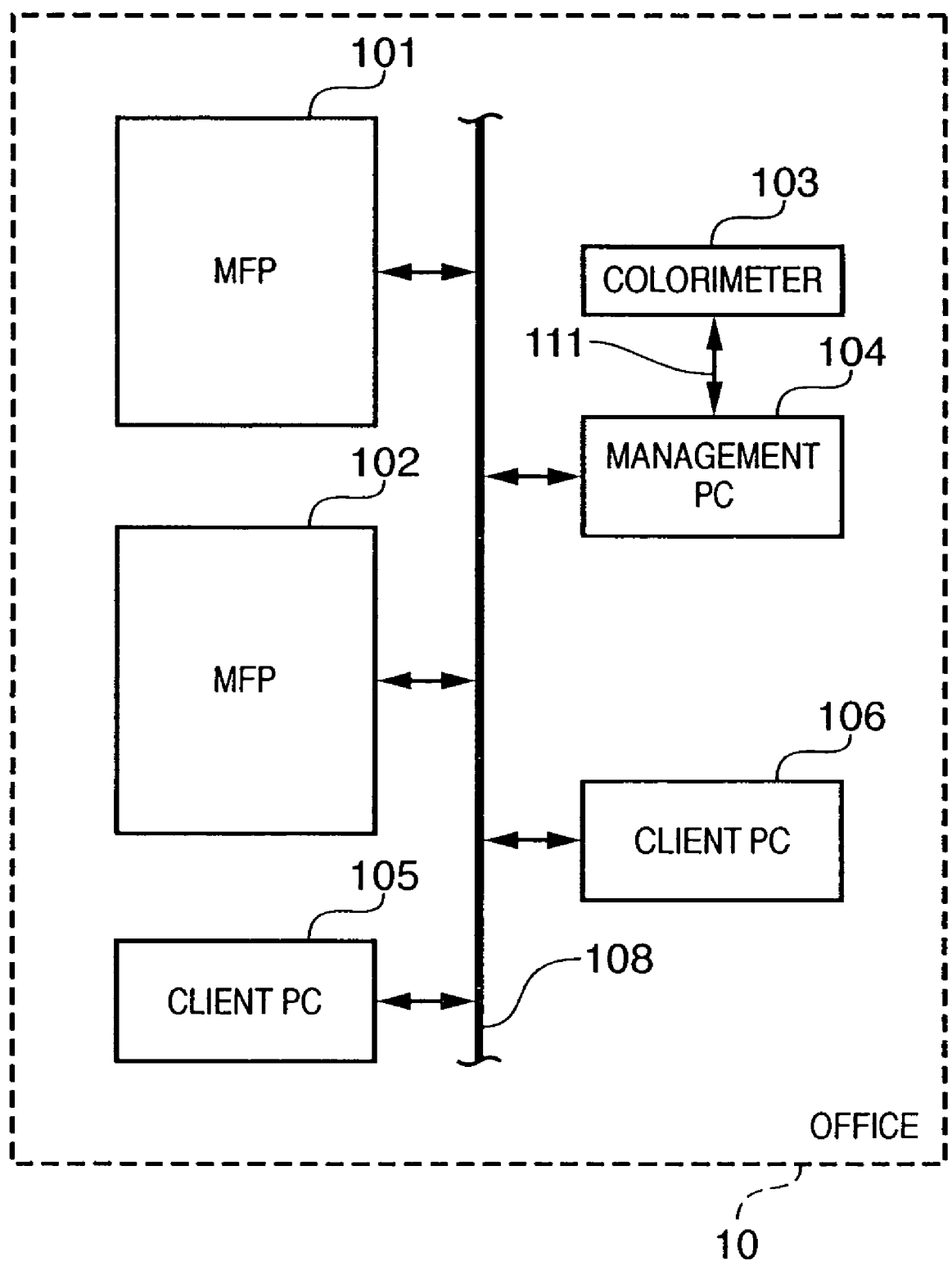
FIG. 3 is a block diagram showing the arrangement of an image processing system according to the first embodiment.

FIG. 3 is a block diagram showing the arrangement of an image processing system according to the first embodiment.

Multi-functional peripheral equipments (MFPs) 101 and 102, management PC 104, client PCs 105 and 106, and the like are connected to a network 108 in an office 10. In this environment, the users of the client PCs 105 and 106 issue print instructions as needed using various applications. Upon issuance of the print instruction, a printer driver installed in each of these PCs generates page description language (PDL) data described in a PDL on the basis of data supplied from the application, and transmits the PDL data to the MFP designated by the user. Each of the MFPs 101 and 102 converts the PDL data sent via the network 108 into a format that can be processed by its printer engine, and supplies the converted data to the printer engine.

The management PC 104 executes a process of calorimetric values obtained by a calorimeter 103 connected via a serial bus 111 such as Universal Serial Bus (USB), IEEE1394, or the like, a profile update process, and uploading/downloading of profiles to the MFPs.

Note that each of the management PC 104 and client PCs 105 and 106 has a memory for storing images and image processing software, a monitor, input devices such as a keyboard, mouse, and the like, a serial bus interface, and the like (not shown). Each of these PCs can input an image from an image input device such as a digital camera or the like or a server which can be connected via the network 108, can apply image processing to the input image, and can output the image that has undergone the image processing to the MFP 101 or 102 or the server. These processes are executed by a CPU of the management PC or client PC using a RAM as a work memory. Alternatively, the management PC 104 may be included in the MFP as a device for the profile update process (to be described later).

Figure 4:
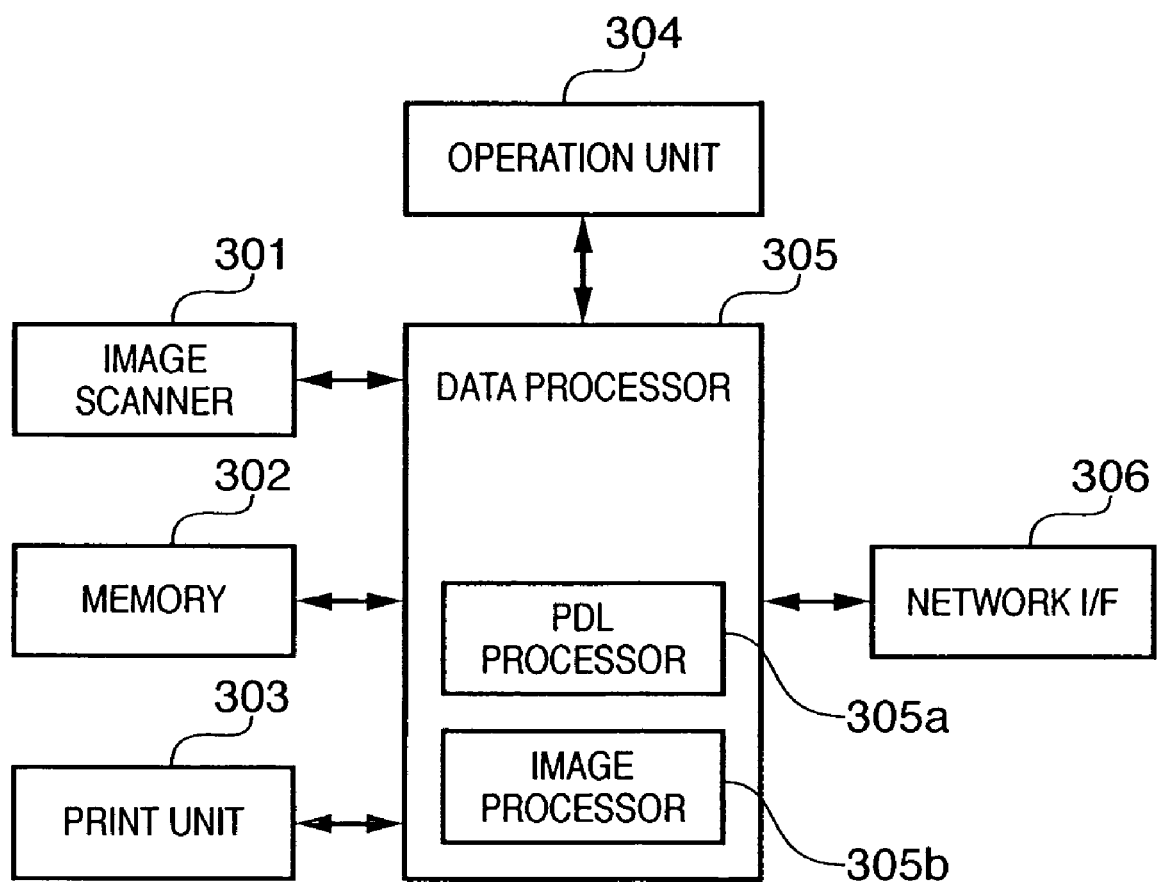
FIG. 4 is a block diagram showing the arrangement of an MFP.

FIG. 4 is a block diagram showing the arrangement of the MFP.

An image scanner 301 irradiates a document fed by an auto document feeder with light coming from a light source, forms a reflected image of the document on a solid-state image sensing element via a lens, and acquires image data of, e.g., a resolution of 600 dpi by an image scan signal, which is output in the raster order from the solid-state image sensing element. Upon executing a normal copy function, a data processor 305 converts image data into a print signal by an image processor 305b, outputs the converted signal to a print unit 303, and forms a copy image on a print sheet. When a plurality of pages of copy images are to be formed, the data processor 305 temporarily stores a print signal for one page in a memory 302, and supplies the print signal read out from the memory 302 in synchronism with the operation of the print unit 303, thus forming a plurality of pages of copy images.

On the other hand, upon executing a print function, the data processor 305 spools PDL data received by a network interface (I/F) 306 via the network 108 in the memory 302. The data processor 305 then applies a rendering process and color conversion process using ICC profiles to the PDL data read out from the memory 302 by a PDL processor 305a. Furthermore, the data processor 305 applies image processes such as UCR, a masking process, gamma correction, and the like to the PDL data to convert it into a print signal, and outputs the print signal to the print unit 303, thereby forming a copy image on a print sheet.

An operation unit 304 accepts instruction inputs of the operator via a keyboard, switches, or a user interface displayed on an LCD panel or the like, and displays status messages such as the states of instruction inputs, the operations (the progress of the image process or image formation) of the MFP, errors (jam, out of paper, the presence/absence of toner), and the like.

[Color Conversion Process]

Figure 5:
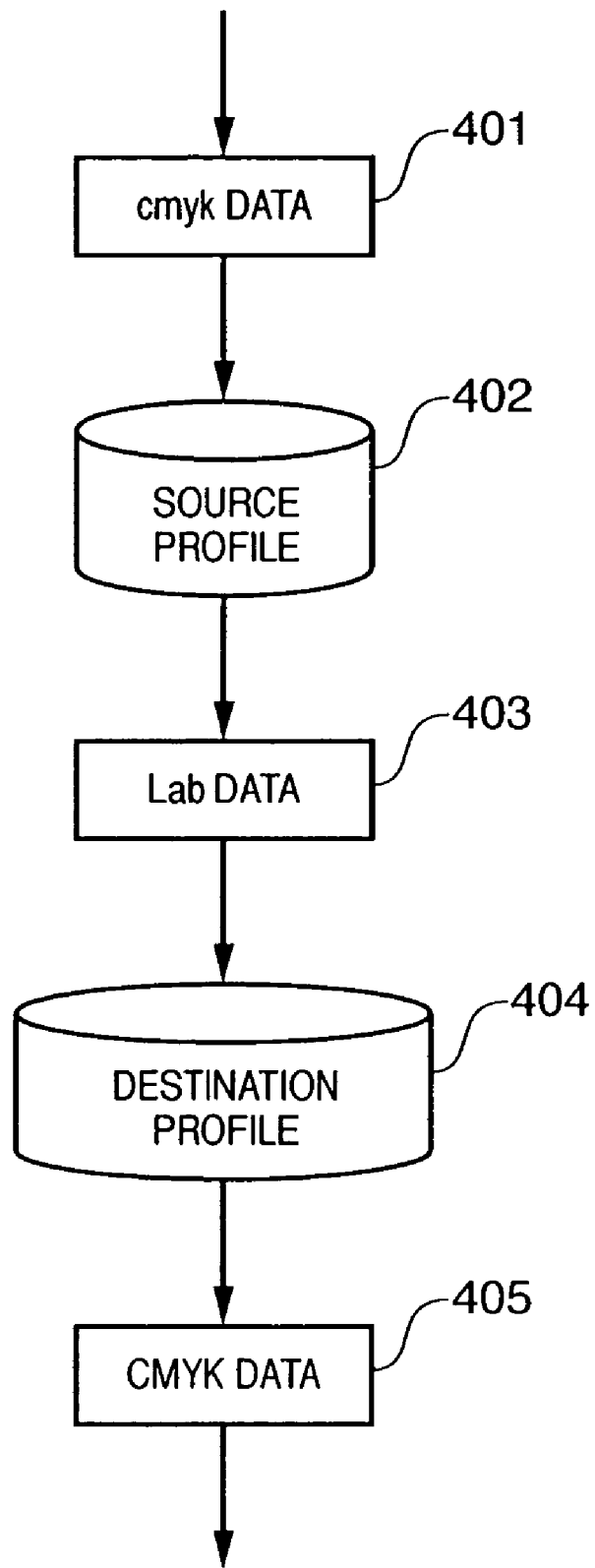
FIG. 5 is a chart showing the color conversion process of a PDL processor.

FIG. 5 is a chart showing the color conversion process of the PDL processor 305a.

The PDL processor 305a converts cmyk data 401, which are converted from an RGB color space into a CMYK color space by a printer driver or rendering process, into Lab data 403 in an L*a*b* color space using a source profile 402. The PDL processor 305a then converts the Lab data 403 into CMYK data 405 using a destination profile 404.

Upon inputting data in the CMYK color space, it is a common practice to designate a simulation profile that simulates a printer as the source profile 402. As such examples, profiles for printers of standard ink settings such as DIC (DAINIPPON INK AND CHEMICALS, INCORPORATED, Japanese standard), SWOP (USA standard), and the like are known. With such profile, CMYK color values of a printer are converted into color values in an absolute color space (L*a*b* color space in this example), and the CMYK data in the CMYK color space of the print unit 303 are obtained by the destination profile 404 as a profile of the print unit 303. Note that the cmyk data 401 and CMYK data 405 have different values since they have the same dimensions of data but are defined in the color spaces of different devices.

Of course, the PDL processor 305a may directly output the cmyk data 401 as the CMYK data 405 without any color conversion process.

The source profile 402 and destination profile 404 are held in the memory 302, and the data processor 305 reads out the profiles as needed to execute the processes. The data processor 305 can transmit the profiles read out from the memory 302 and can store profiles received from the management PC 104 in the memory 302 in response to profile upload and download requests from the management PC 104.

The PDL processor 305a can process data which are not converted from the RGB color space into the CMYK color space. In this case, an RGB profile such as an sRGB monitor profile for, e.g., an sRGB color space or the like can be used as the source profile 402 to convert RGB data into the Lab data 403.

[Management PC]

Figure 6:
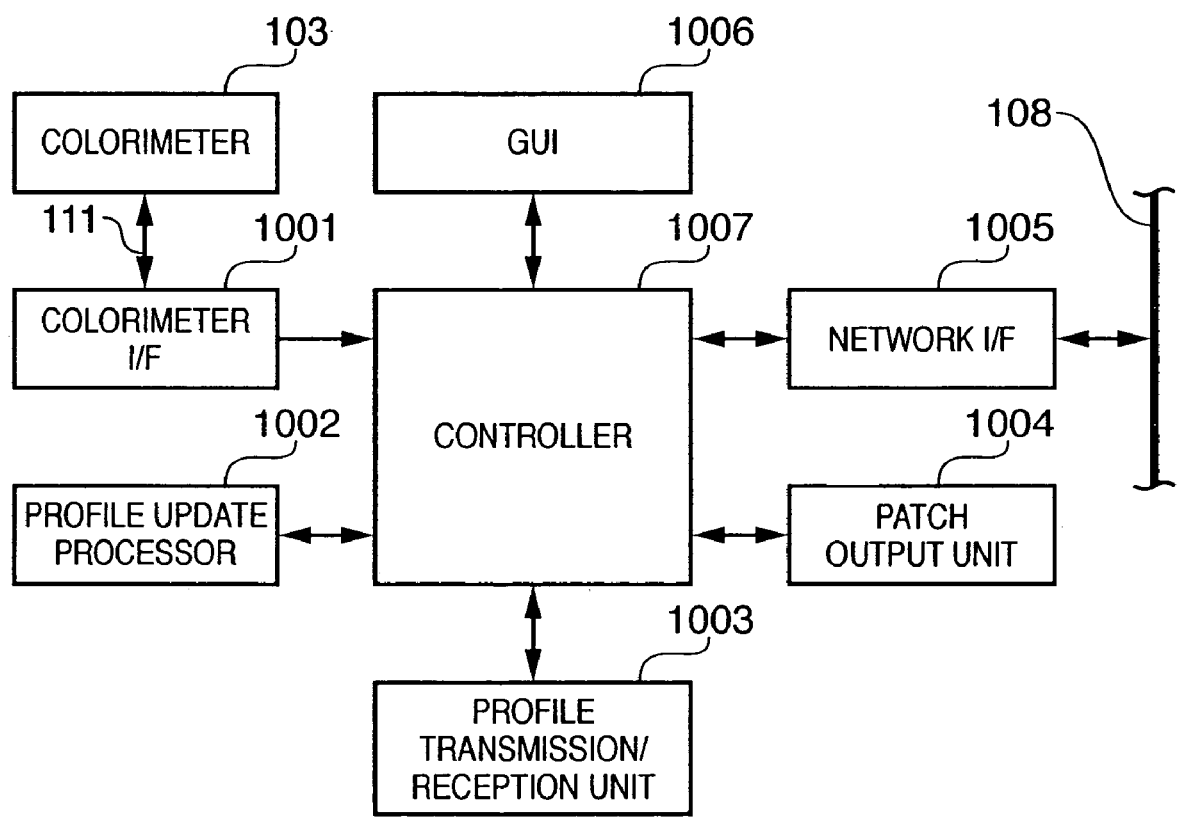
FIG. 6 is a block diagram for explaining the processes to be executed by a management PC.

FIG. 6 is a block diagram for explaining processes to be executed by the management PC 104. Note that all the processes of the management PC 104 to be described below are implemented by software. That is, the CPU of the management PC 104 executes a program which is read out from a nonvolatile memory such as a hard disk drive (HDD) or the like equipped in the management PC 104, and is loaded onto the RAM of the management PC 104, thus implementing all the processes.

The calorimeter 103 outputs measurement values obtained by converting spectral sensitivities, which are acquired by irradiating a sample with light and reading the reflected light using a sensor, into Lab values. A colorimeter I/F 1001 is a module which interfaces with the calorimeter 103 via the serial bus 111, and includes a serial bus interface module and calorimeter handling module. The colorimeter I/F 1001 controls the colorimeter 103 and receives Lab values output from it.

A profile update processor 1002 is a module which executes a process for updating the LUT of a profile received from the MFP into the one optimal to that MFP on the basis of colorimetric values (Lab values) output from the MFP. This process will be described in detail later. A profile transmission/reception unit 1003 is a module which exchanges a profile to be updated of the MFP via a network I/F 1005. When a profile is to be received from the MFP, the profile transmission/reception unit 1003 transmits a destination profile transmission request command to the MFP, and receives a profile transmitted from the MFP in response to this command. Upon transmitting the updated profile to the MFP, the unit 1003 appends the profile to a profile transmission command, and then transmits that command to the MFP.

A patch output unit 1004 is a module which generates CMYK patch data required to obtain Lab values, which correspond to CMYK values used in the profile update processor 1002, or reads out CMYK patch data from the HDD or the like of the management PC 104, and transmits a patch print command to the MFP while appending the CMYK patch data to the command.

A graphical user interface (GUI) 1006 receives a user's instruction to a user interface displayed on the monitor via the input device such as a keyboard, mouse, or the like, and supplies it to a controller 1007. For example, the GUI 1006 accepts user's instructions for specifying the MFP and profile upon exchanging a profile, accepts a user's instruction for specifying the MFP upon patch output, or displays the colorimetry state and accepts a user's instruction indicating the start of colorimetry upon colorimetry. That is, the operations of the aforementioned units are controlled by the controller 1007 in accordance with user's instructions input to the GUI 1006.

[Profile Update Process]

Figure 7:
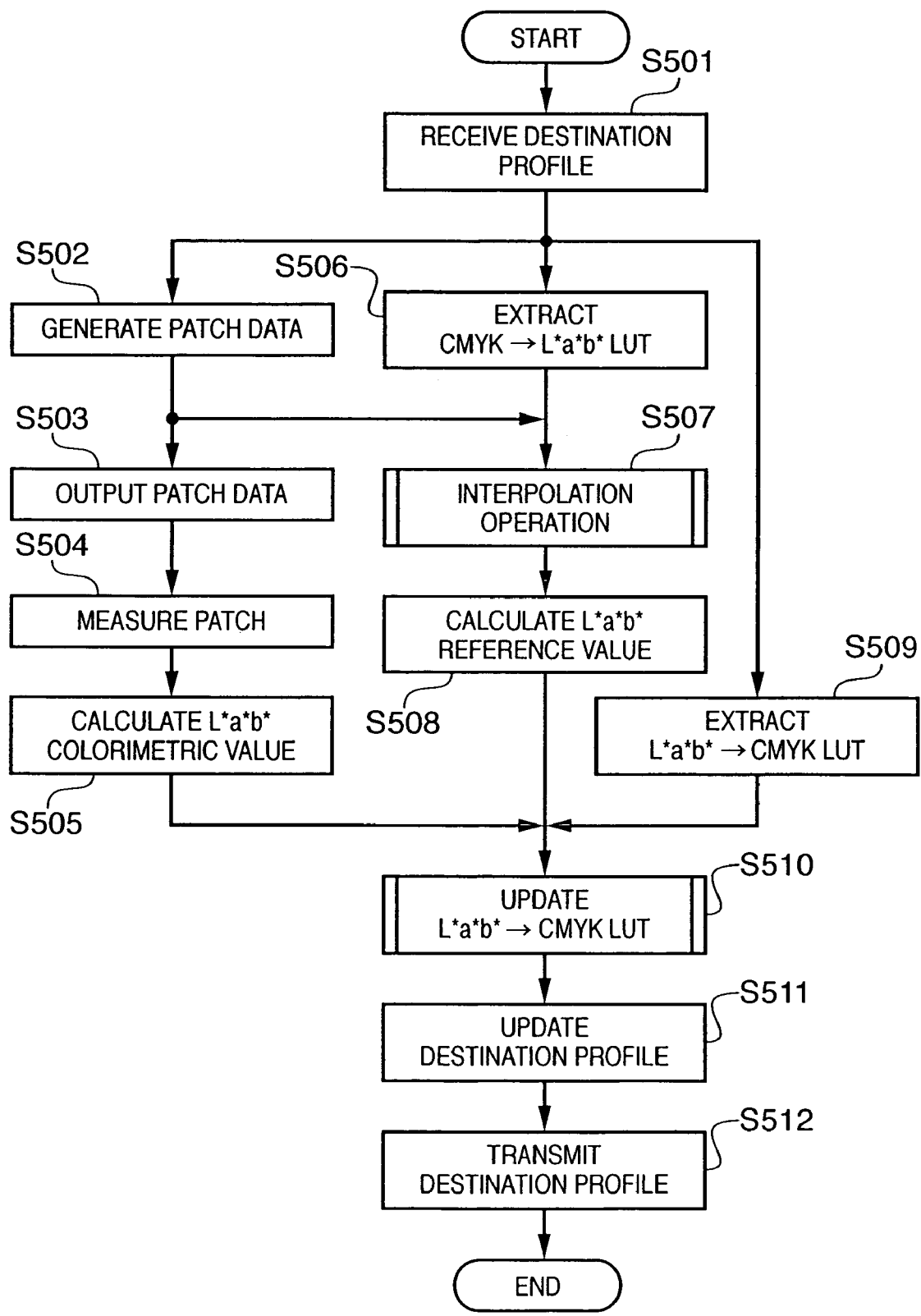
FIG. 7 is a flowchart showing an overview of a profile update process.

FIG. 7 is a flowchart showing an overview of the profile update process, which is executed by the controller 1007 in accordance with a user's profile update instruction.

The controller 1007 controls the profile transmission/reception unit 1003 to receive a destination profile (ICC profile) used as a standard profile of the MFP (in this case, the MFP 101) from the MFP 101 designated by the user (S501).

The controller 1007 then controls the patch output unit 1004 to generate patch data to be output using the received destination profile (S502). This patch data includes about hundred multi-order colors, i.e., CMYK numerical value data and their image data. Details of the method of generating the patch data will be described later. Note that multi-order color data includes at least two color components of CMYK in place of one color component data (e.g., CMYK=(120, 0, 0, 0), primary color) of CMYK. For example, a secondary color is, e.g., CMYK=(120, 0, 250, 0), a tertiary color is, e.g., (130, 120, 110, 0), a quaternary color is, e.g., CMYK=(50, 138, 78, 20), and so forth. Of course, combinations of these numerical values and color components are examples.

The controller 1007 controls the patch output unit 1004 to transmit the patch data to the MFP 101 and to control the MFP 101 to print patches (S503). Note that the controller 1007 instructs the MFP 101 to print patch data (cmyk data 401) as the CMYK data 405 intact without the intervention of the source profile 402 and destination profile 404 shown in FIG. 5.

When the user sets the patch sheet printed by the MFP 101 on a colorimetric unit of the calorimeter 103, and instructs to start colorimetry, the controller 1007 controls the colorimeter I/F 1001 to make colorimetry (S504), and to acquire calorimetric values (Lab values) (S505).

On the other hand, the controller 1007 controls the profile update processor 1002 to execute processes in steps S506 to S511. That is, the profile update processor 1002 extracts an LUT used to convert CMYK values into Lab values (to be referred to as a "CMYK to Lab LUT" hereinafter) included in the destination profile (S506), makes an interpolation operation using the numerical value data of the patches generated in step S502 and the CMYK to Lab LUT (S507), and calculates Lab reference values (S508). Also, the profile update processor 1002 extracts an LUT used to convert Lab values into CMYK values (to be referred to as an "Lab to CMYK LUT" hereinafter) from the destination profile (S509).

After the colorimetric values (Lab values), Lab reference values, and Lab to CMYK LUT are obtained, the profile update processor 1002 updates the Lab to CMYK LUT using these values (S510), and also updates the destination profile by the updated Lab to CMYK LUT (S511).

The controller 1007 controls the profile transmission/reception unit 1003 to transmit a profile transmission command to the MFP 101 while appending the updated destination profile to the command, and to store the destination profile in the MFP 101 (S512).

By using the destination profile updated by the aforementioned processes in an actual print process, an image with an appropriate tint can be obtained independently of the state of the device (MFP in this case).

The aforementioned processes will be described in detail below.

Interpolation Operation (S507)

The interpolation operation is a process for calculating Lab values corresponding to CMYK values. That is, since the CMYK to Lab LUT describes Lab values corresponding to given CMYK values, Lab values corresponding to CMYK values of the patch data can be calculated by making the interpolation operation using this LUT.

Figure 8:
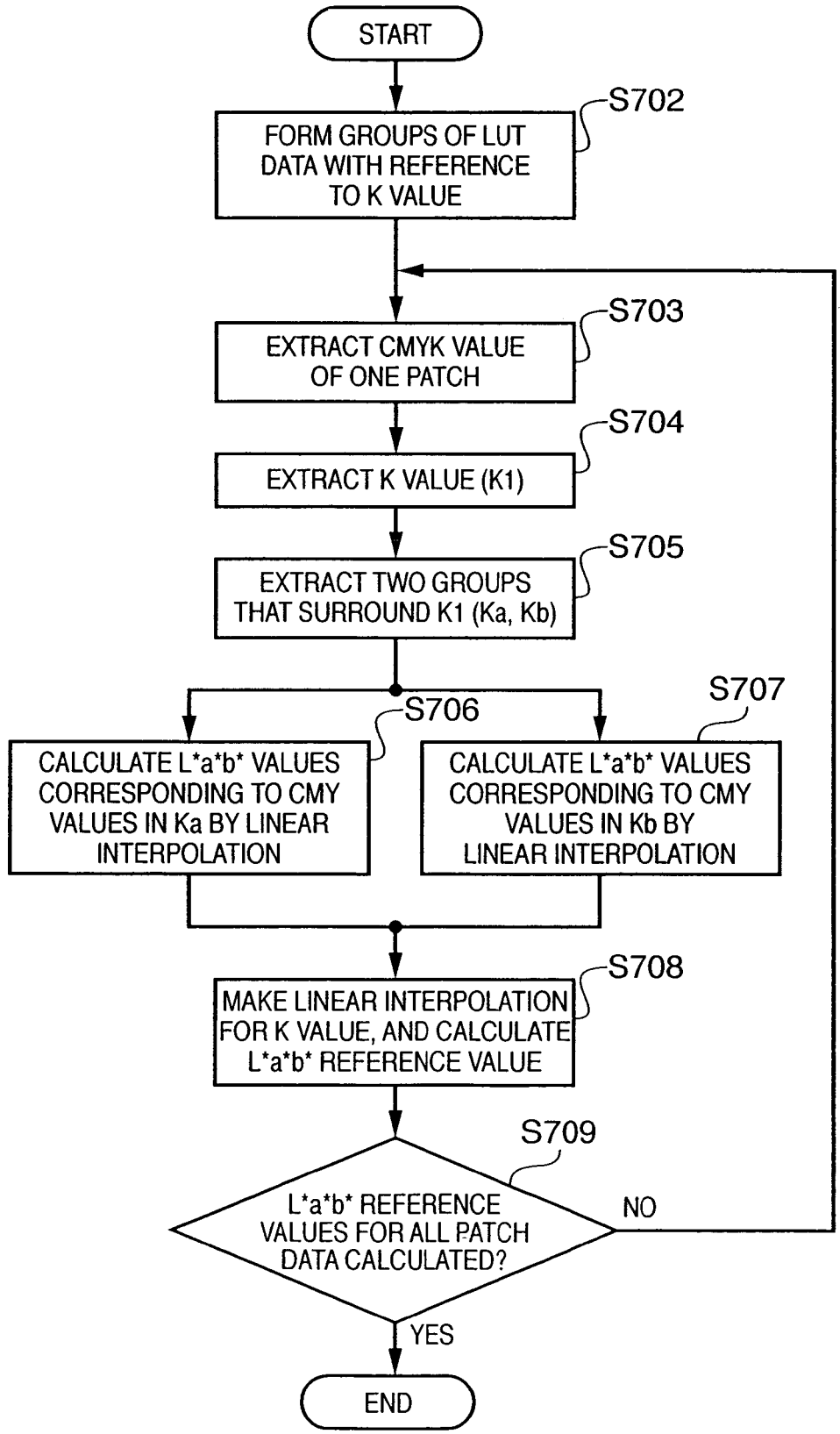
FIG. 8 is a flowchart for explaining details of an interpolation operation.

FIG. 8 is a flowchart for explaining details of the interpolation operation (S507).

Data of the CMYK to Lab LUT are grouped with reference to a K value (S702). The input color values of the LUT indicate color values and also serve as input grid points to the LUT, and the number of color values increases incrementally. Therefore, assuming each of CMYK components has 17 levels, if data are grouped with reference to the K value, 17×17×17×17 grid points are classified into 17 groups of 17×17×17 grid points.

Next, a CMYK value of one patch is extracted (S703), and the K value of the extracted CMYK value is selected as a K value of interest (S704). Let "K1" be the K value of interest.

By focusing attention on the K values of the grouped LUT data, two groups that surround K1 are extracted (S705). For example, when the number of gray levels of a color is 256, there are 17 levels of LUTs, and K1=20, groups of K=16 and K=32 are extracted. Let Ka be the group with a small K value, and Kb be the group with a large K value. For the groups Ka and Kb, Lab values corresponding to CMY values of the patches are calculated by linear interpolation (S706, S707). This linear interpolation uses a known three-dimensional method.

From the linear interpolation results (i.e., Lab values corresponding to CMYKa and CMYKb values) in steps S706 and S707, one-dimensional linear interpolation for the K value is made to obtain an Lab value (Lab reference value) corresponding to the CMYK value (S708).

The processes in steps S703 to S708 are repeated until it is determined in step S709 that calculations of Lab reference values for all the patch data (CMYK values) are complete.

Update Lab to CMYK LUT

The destination profile takes charge of a part for converting data in the absolute color space into the color space of the output device in an actual print process. Therefore, when the Lab to CMYK LUT of the destination profile is appropriately adjusted and updated, output result differences due to variations of the device characteristics and individual differences of the output devices can be absorbed.

Figure 9:
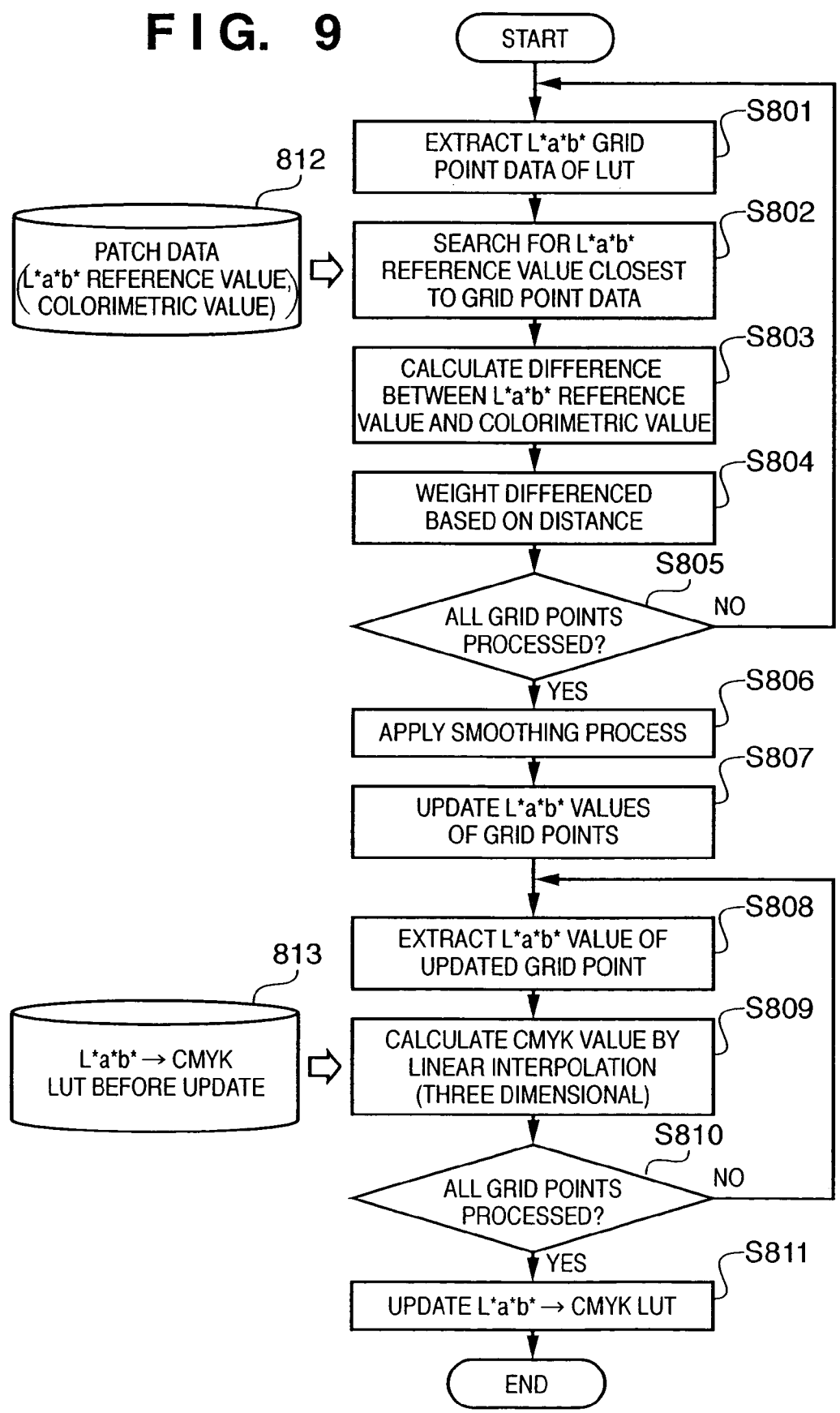
FIG. 9 is a flowchart for explaining details of an Lab to CMYK LUT update process.

FIG. 9 is a flowchart for explaining details of the Lab to CMYK LUT update process. Note that memories 812 and 813 shown in FIG. 9 are assigned to predetermined areas on the RAM or HDD of the management PC 104.

Figure 10:
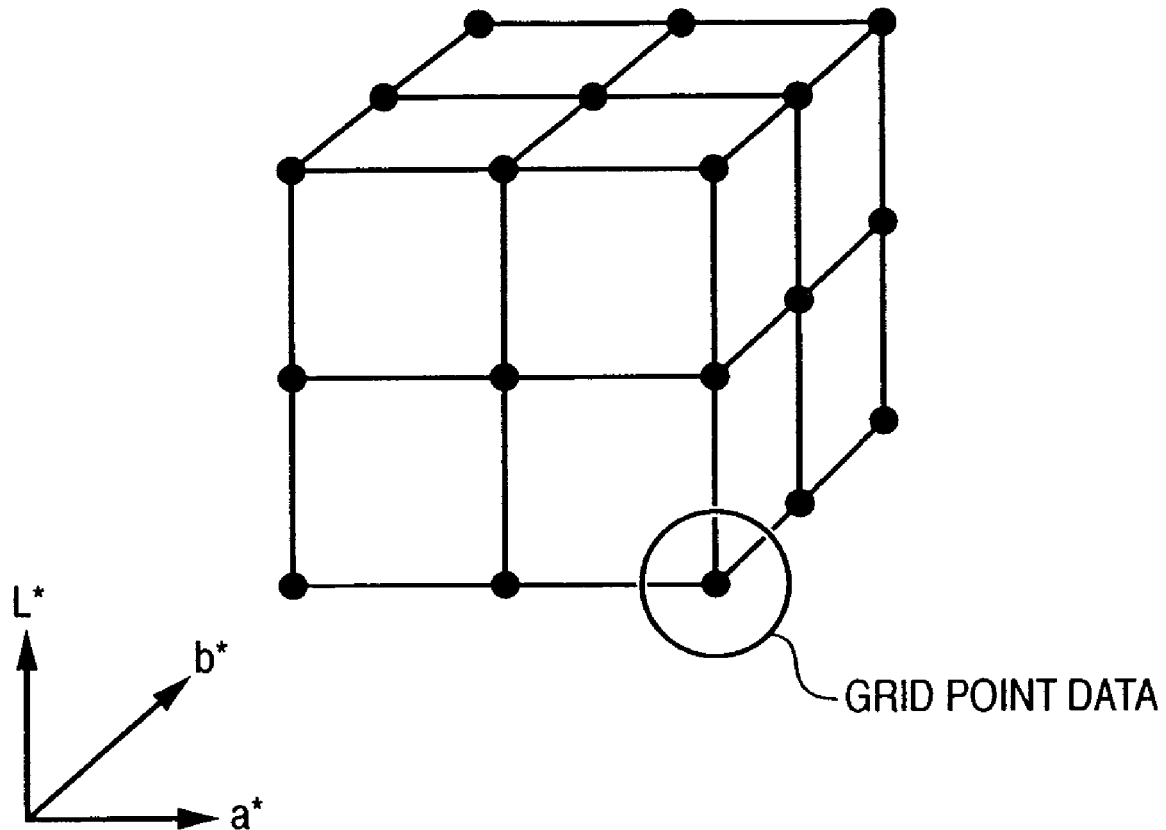
FIG. 10 is a view showing grid point data in the Lab color space.

A color value of one Lab grid point (Lab grid point data) is extracted (S801). Note that the Lab grid point data are data whose increments are fixed. FIG. 10 shows grid point data in the Lab color space. For example, when the Lab to CMYK LUT includes 33 levels of Lab components, one of 33×33×33 grid points is extracted in step S801.

Figure 11:
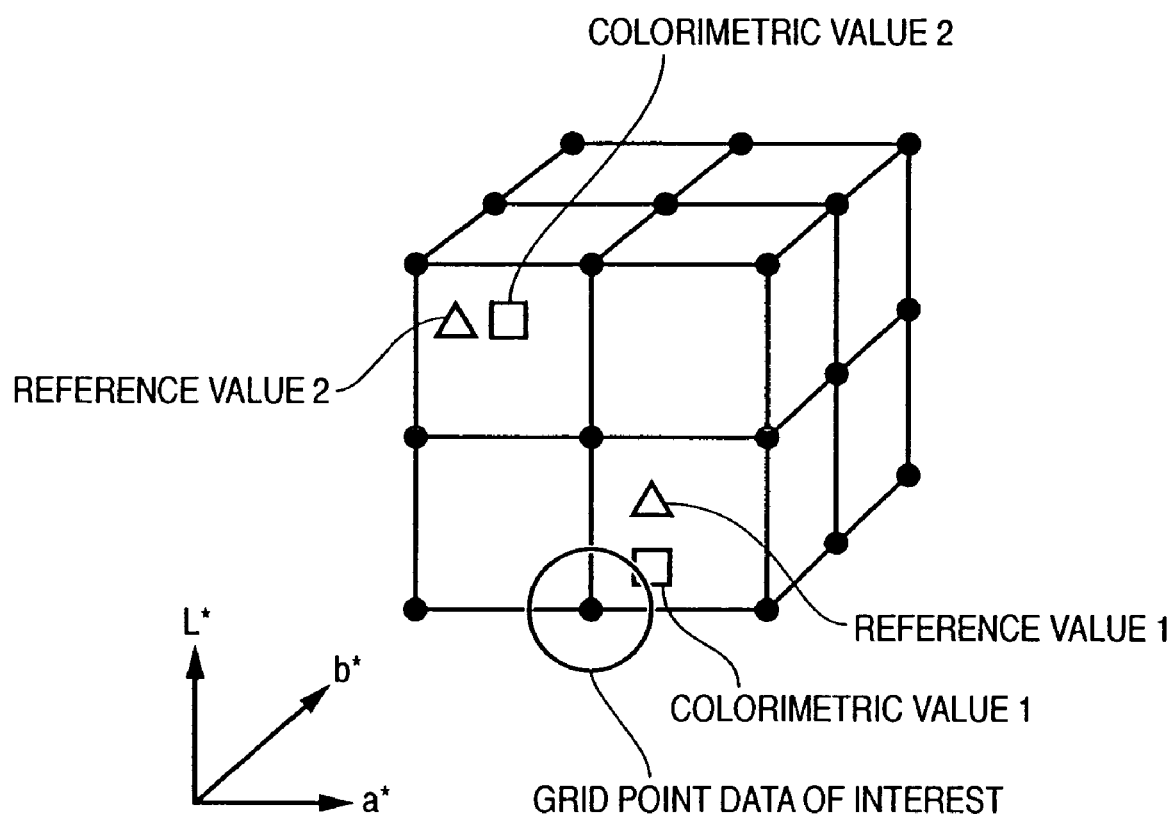
FIG. 11 is a view showing the relationship among Lab grid point data, Lab reference values and colorimetric values.

An Lab reference value of the patch data, which is closest to the Lab grid point data extracted in step S801 and is stored in the memory 812, is searched for (S802). FIG. 11 shows the relationship among the Lab grid point data, Lab reference values, and calorimetric values. In FIG. 11, reference values 1 and 2 exist, but since reference value 1 is closer to the Lab grid point data of interest, it is selected as a search result.

A difference D between the found Lab reference value and the corresponding colorimetric value (the difference between Lab reference value 1 and calorimetric value 1 in the example of FIG. 11) is calculated (S803). Using this difference D, the Lab grid point data is updated. However, if the number of patch data is small, an Lab reference value farther from the Lab grid point data is often selected as a search result. Since it is not desirable that the update process is influenced by the Lab reference value farther from the Lab grid point data, a distance between the Lab reference value and Lab grid point data is calculated, and weighting is made according to the distance (S804). For example, a Euclidean distance in the three-dimensional space is adopted as the distance, and weighting is made by:

$$D \cdot W = D/dist^{(5+1)} \quad (1)$$

where D is the weight, and dist is a value obtained by normalizing the distance from the Lab reference value by a distance for three grid points.

Steps S801 to S804 are repeated until it is determined in step S805 that the processes for all the Lab grid points of the LUT are complete.

Figure 12:
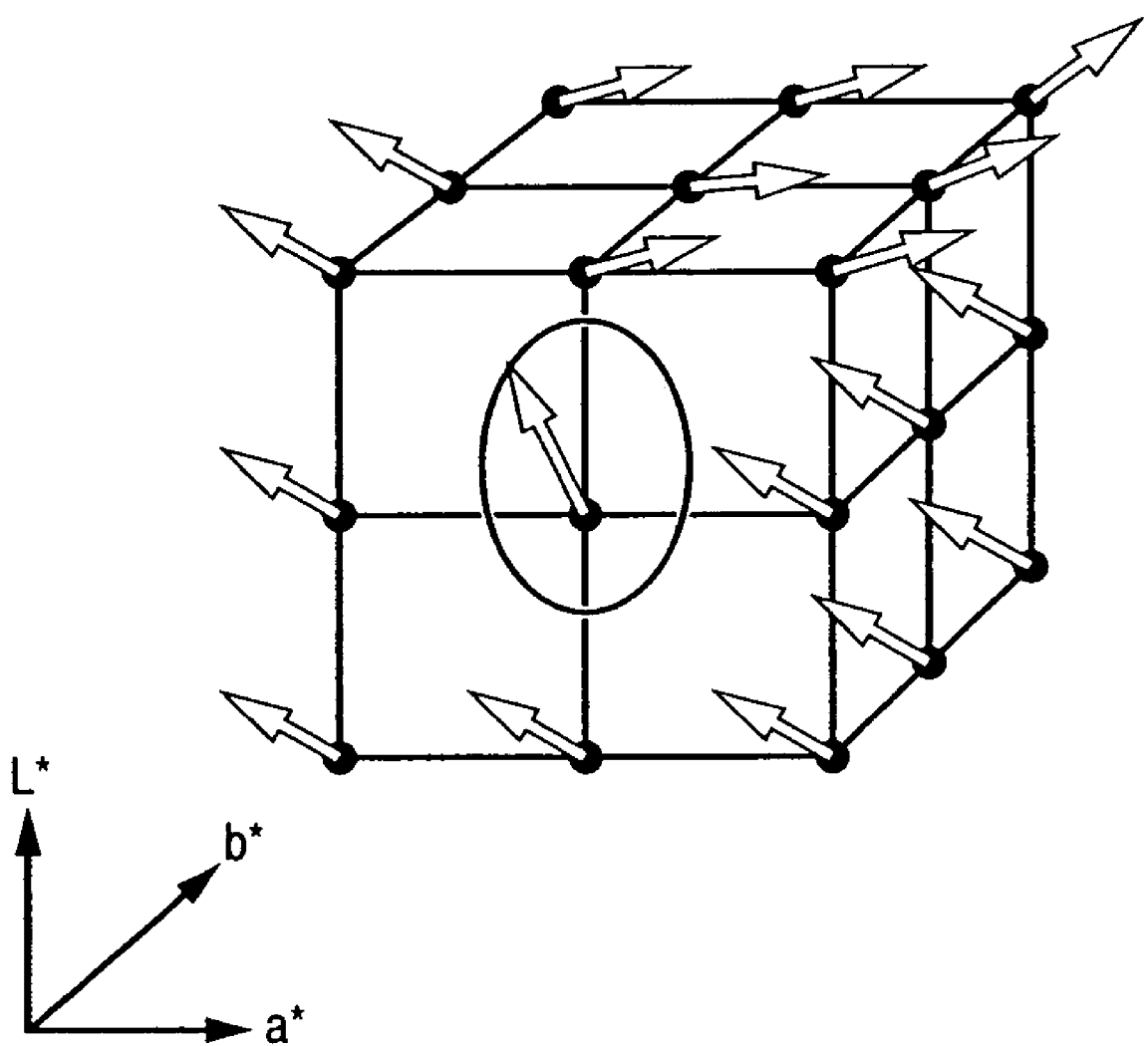
FIG. 12 is a view for explaining the calculation results of differences D between the Lab reference values and colorimetric values with respect to Lab grid points.
Figure 13:
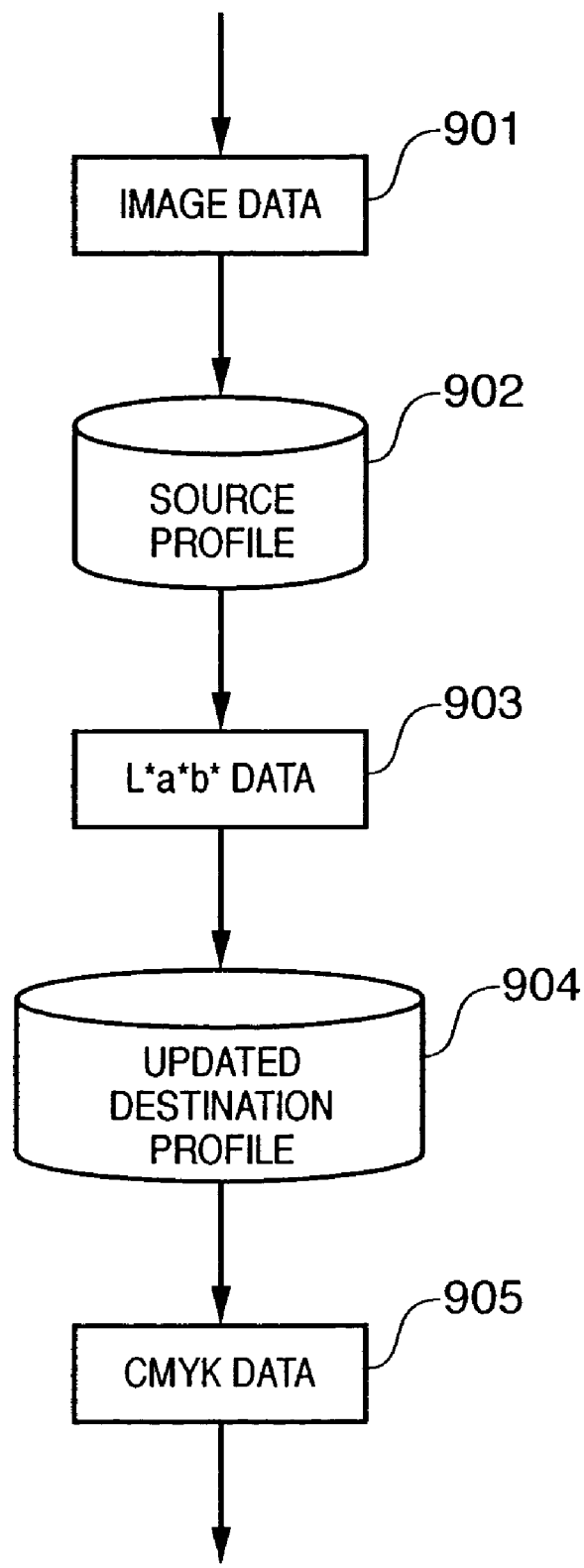
FIG. 13 is a view for explaining possibility of the presence of a direction vector having an excessive direction and size depending on an Lab reference value explored with respect to an Lab grid point.

FIG. 12 is a view for explaining the calculation results of differences D between the Lab reference values and colorimetric values with respect to Lab grid points. In FIG. 12, each arrow represents a direction vector which is headed from a colorimetric value to an Lab reference value. The Lab value of a grid point is shifted by this direction vector. However, a direction vector with an excessive direction and size may be present depending on the Lab reference value explored with respect to the Lab grid point. In the example of FIG. 13, a direction vector of a grid point surrounded by an ellipse is illustrated to have an excessive size compared to surrounding direction vectors. If such direction vector is present, the Lab value of the grid point is excessively updated, and a pseudo contour may be generated.

Hence, the calculated differences D·W undergo a smoothing process (S806) to prevent the Lab values of the grid points from being excessively updated. As the smoothing method, a method of calculating a total of the differences D·W corresponding to grid points within a 5×5×5 range to have the grid point of interest as the center, and calculating its average, a method of calculating a severalfold value of the difference D·W corresponding to the grid point of interest, calculating a total of that value and the differences D·W corresponding to other grid points, and then calculating the average, and the like may be used.

Differences D' that have undergone the smoothing process are added to the Lab grid point data to update the grid points (S807), and one Lab grid point data is extracted from the updated grid points (S808). If CMYK values corresponding to the updated grid points are known, the Lab to CMYK LUT of the destination profile can be updated. Hence, by utilizing the fact that the Lab to CMYK LUT before update, which is stored in the memory 813, is an LUT that describes conversion from Lab to CMYK, a three-dimensional linear interpolation operation is applied to the Lab value of the updated grid point to calculate a CMYK value (S809).

Steps S808 and S809 are repeated until it is determined in step S810 that the processes for all the Lab grid points of the LUT are complete. If the CMYK values of all the Lab grid points are calculated, the Lab to CMYK LUT is updated by the results (S811).

When such processes are similarly periodically applied not only to the MFP 101 but also to the MFP 102, tint differences due to variations of the device characteristics and individual differences can be greatly reduced. Therefore, in a cluster printing system which supplies identical data to a plurality of devices, even a printing method which suffers a considerable change in tint due to variations of the device characteristics like in an electrophotographic printer can obtain printouts with uniform tints. In this case, since profiles incorporated in respective devices are the same ones as a default, a common CMYK to Lab LUT (i.e., a reference state) is used, and the Lab to CMYK LUTs of the profiles of the respective devices are updated to match the reference state.

When an image is printed using the destination profile that has undergone the update process, that image data need not be CMYK data. FIG. 13 shows the color conversion process of the PDL processor 305a in an actual print process. If a source profile 902 that converts image data 901 into Lab data 903 is available, CMYK data 905 can be generated using an updated destination profile 904. For example, if the source profile 902 converts RGB data into Lab data, the image data 901 may be RGB data. Of course, the source profile is not particularly limited as long as it converts the input color space into the absolute color space (Lab in the example) to be processed by the updated destination profile.

[Patch Data Generation Method]

The aforementioned Lab to CMYK update process calculates differences D between the Lab reference values and calorimetric values in the Lab color space as the grid point space, weights the differences D, and feeds back the weighted differences to the Lab values of the grid points. In this case, in order to avoid deviations of the correction precision among grid points, patches are preferably formed so that difference vectors between colorimetric values and Lab reference values are uniformly distributed in the Lab space.

Hence, uniform Lab values are generated in the Lab color space, and CMYK values corresponding to the Lab values are calculated using the Lab to CMYK LUT of the profile itself to be updated, thus forming patches that can obtain nearly uniformly distributed colorimetric values in the Lab color space.

Figure 14:
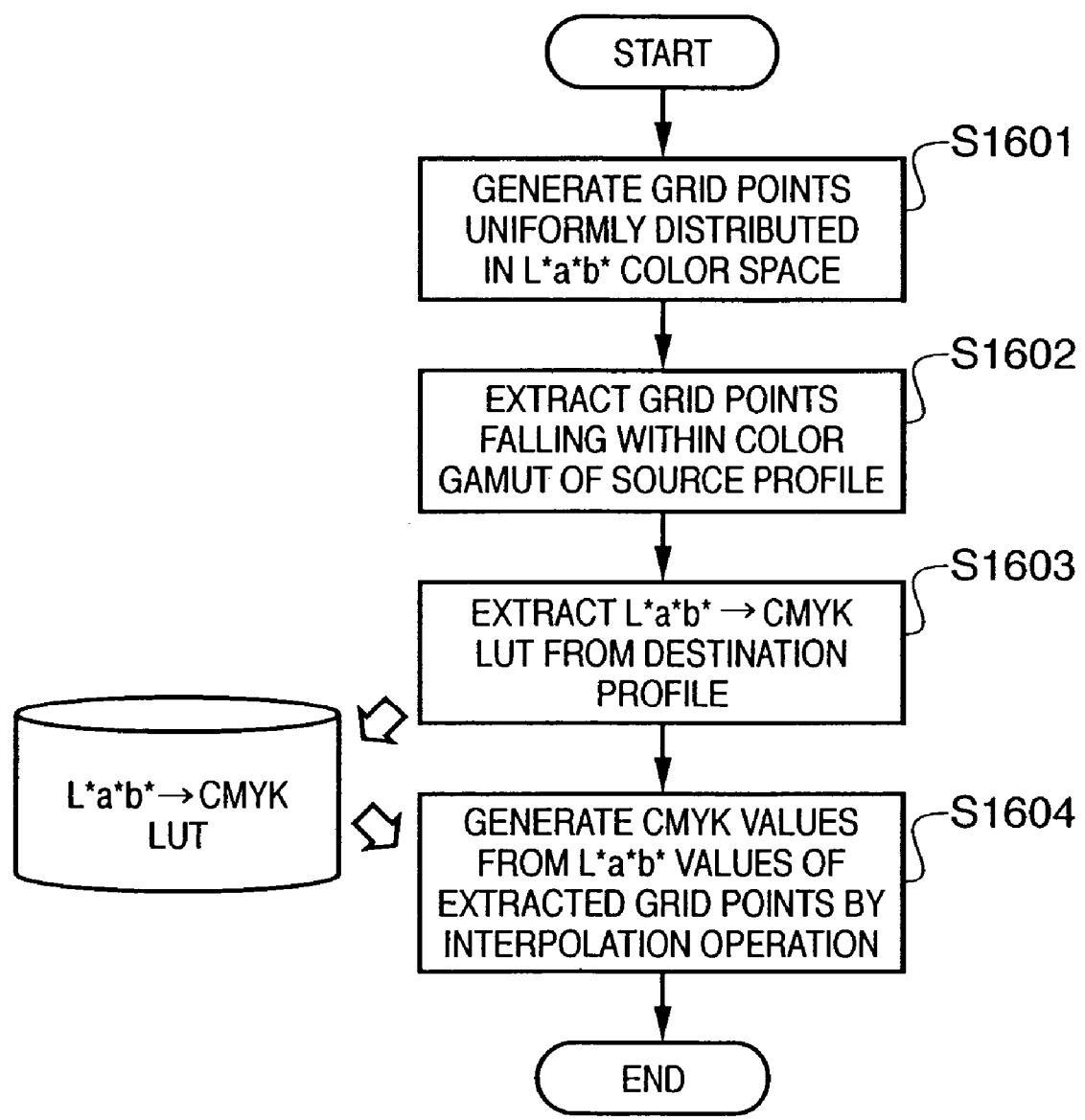
FIG. 14 is a flowchart showing a patch data generation process.

FIG. 14 is a flowchart showing the patch data generation process.

N×N×N grid points which are uniformly distributed in the Lab color space are generated (S1601). The Lab grid points generated in this way cover the whole Lab color space. However, since there are many grid points which are not used in practice, Lab values of grid points to be used are extracted (S1602).

Upon selecting the grid points to be used, those which are located within the color gamut of the source profile assumed in an actual output process may be extracted. For example, if the sRGB color space is assumed as the source profile, its color gamut is broader than that of a general electrophotographic printer, but it does not occupy the whole Lab color space. Therefore, in the actual output process, Lab values of grid points which fall outside the sRGB color space are never output by the source profile side. In other words, such Lab values never become inputs of the Lab to CMYK LUT of the destination profile. For this reason, when grid points, which fall within the sRGB color space, of the generated N×N×N grid points are selected, and the Lab to CMYK LUT around their calorimetric values is adjusted, it suffices to adjust the tint under the situation that the sRGB color space is used as the source profile. By utilizing this relationship, the number of patches can be effectively reduced.

The Lab to CMYK LUT is extracted from the received destination profile (S1603), and CMYK values (patch data) are generated from the Lab values of the extracted grid points by an interpolation operation using the Lab to CMYK LUT (S1604).

Figure 15:
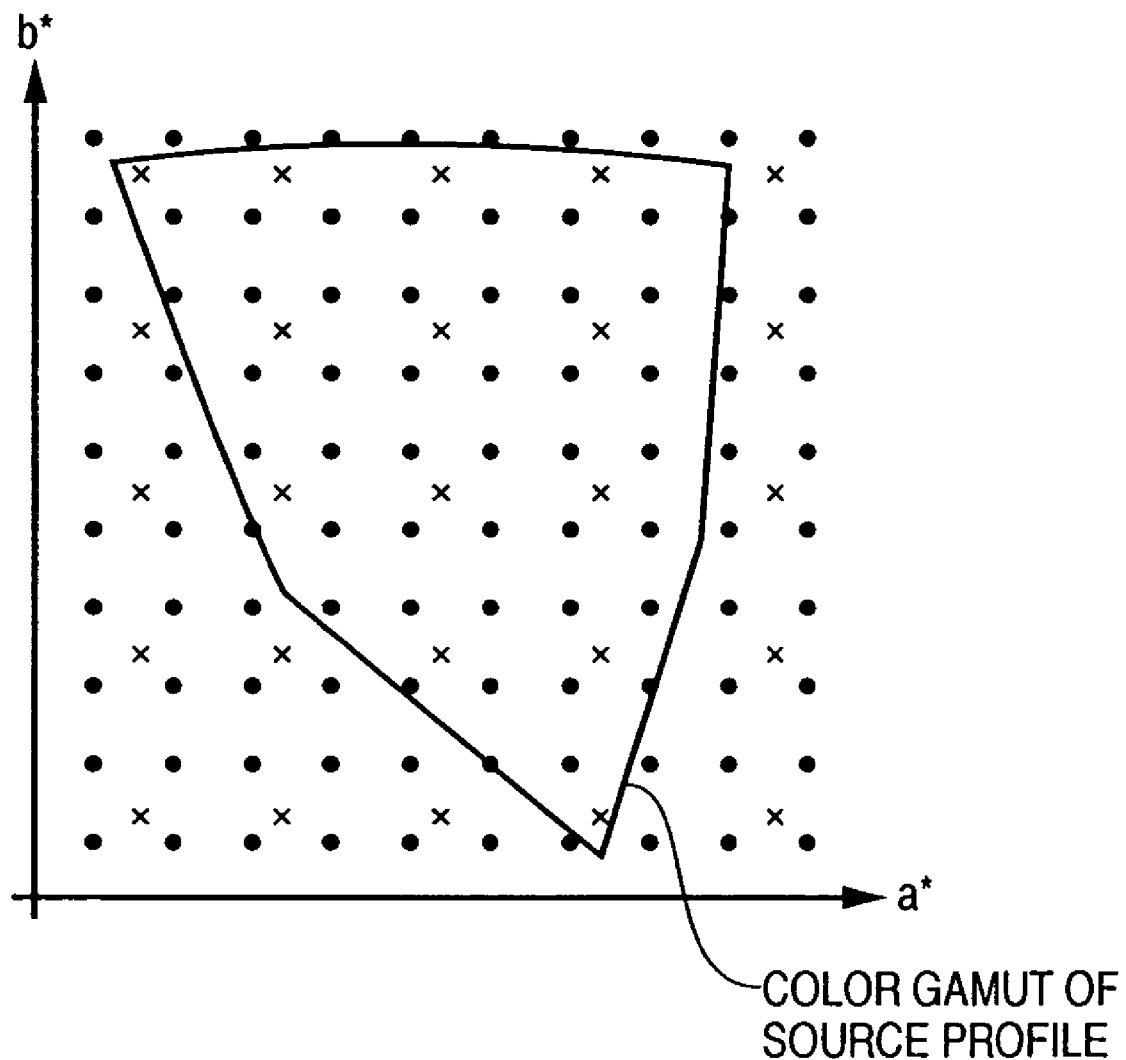
FIG. 15 two-dimensionally shows Lab grid points for patch data generation, Lab to CMYK LUT Lab grid points, and the color gamut of a source profile in the patch data generation process.

FIG. 15 two-dimensionally shows Lab grid points for patch data generation (x), Lab grid points (•) of the Lab to CMYK LUT, and the color gamut (solid line) defined by the source profile in the patch data generation process. Note that the color gamut indicates a color reproduction range of an image input device such as a digital camera, a scanner, a monitor or the like. As shown in FIG. 15, grid points for patch data generation fewer than the grid points of the Lab to CMYK LUT, and those which fall within the color gamut of the source profile are further extracted.

Assuming that the Lab to CMYK LUT has 33×33×33 grid points, the whole LUT has 35,837 grid points. When patches corresponding to Lab values of the 35,837 grid points are formed, colorimetric values corresponding to the Lab color space can be evenly obtained. However, such number of patches are impractical. Hence, when the number of grid points for patch data generation is set to be 9×9×9, the number of patches is reduced to 729. Furthermore, by extracting grid points which fall within the color gamut of the source profile, the number of patches is reduced. Assuming that the color space of the source profile is the sRGB color space, the volume of the sRGB color space is about ⅐ to ⅛ of that of the Lab color space (L=0 to 100, a=−128 to 128, and b=−128 to 128). Therefore, the 729 patches can be reduced to around 90 to 105 patches.

Of course, the number of grid points may be increased to improve the color reproduction precision. However, in such case, a longer time is required for colorimetry. Also, the sRGB color space is assumed as the color space of the source profile, but other RGB color spaces may be used. In an application that prints only CMYK data, the color gamut of a print standard profile such as DIC, SWOP, or the like may be adopted. In this case, since the CMYK color space is often narrower than the RGB color space, the number of patch data can be further reduced.

In this manner, the profile can be easily corrected with high precision on the basis of the profile that is installed in a device such as the MFP or the like or is distributed, and describes the color reproduction characteristics. Therefore, optimal color matching can always be attained. If the method of this embodiment is applied to a plurality of devices, the color reproduction characteristics of these devices can be adjusted to each other.

Note that the image processing is described based on the Lab color space in the first embodiment. However, the color space is not limited to the Lab color space, and an absolute color space such as a profile connection space (PCS) can be used for the above image processing.

Second Embodiment

The image processing according to the second embodiment of the present invention will be described below. Note that the same reference numerals in this embodiment denote the same components as those in the first embodiment, and a detailed description thereof will be omitted.

Figure 16:
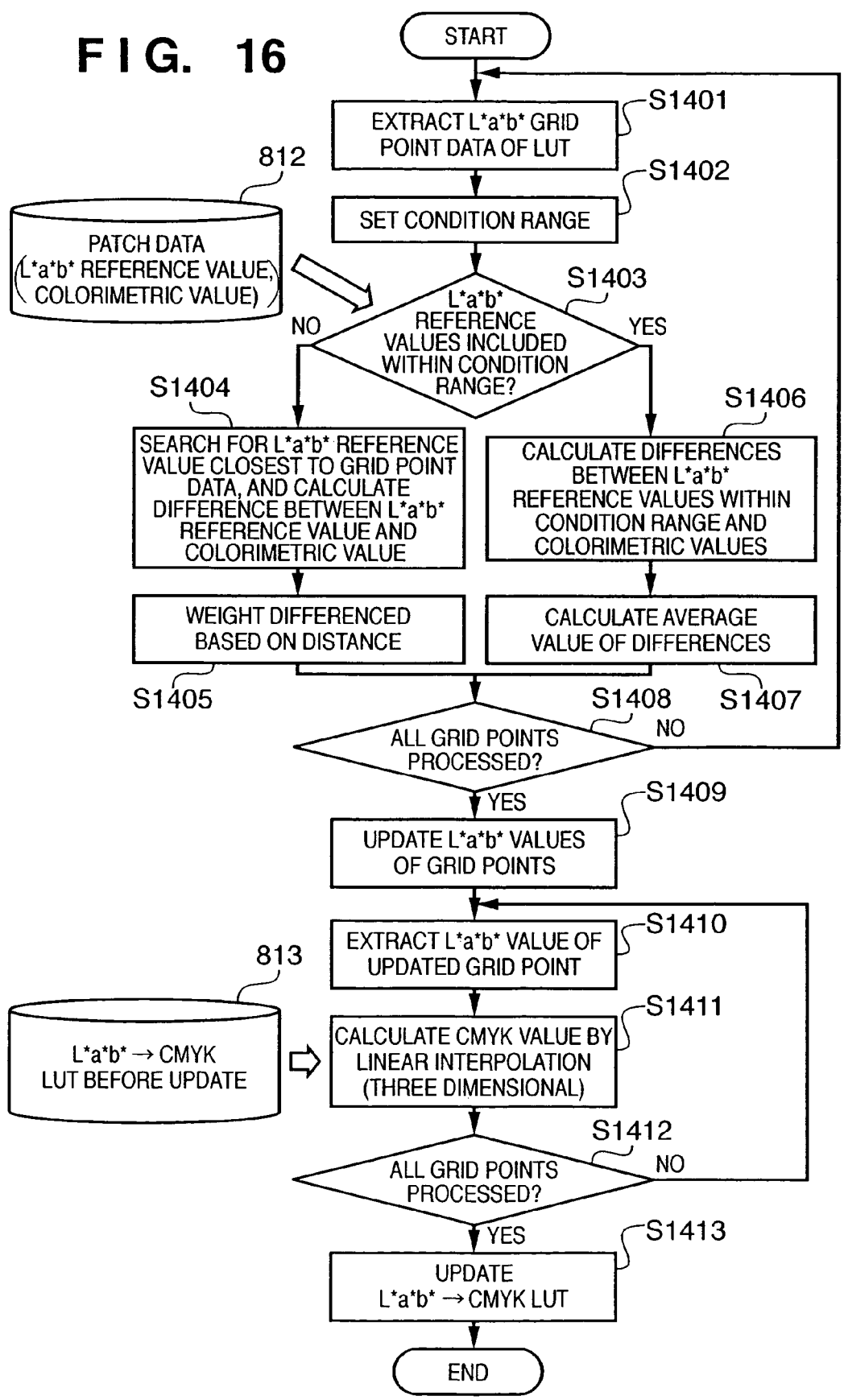
FIG. 16 is a flowchart for explaining details of an Lab to CMYK LUT update process according to the second embodiment.

Another method of updating the Lab to CMYK LUT will be described below. FIG. 16 is a flowchart for explaining details of the Lab to CMYK LUT update process of the second embodiment.

A color value of one Lab grid point (Lab grid point data) of the Lab to CMYK LUT is extracted (S1401), a neighboring range of the extracted Lab grid point data (e.g., a 5×5×5 range having the Lab grid point data as the center; to be referred to as a "condition range" hereinafter) is set (S1402), and it is checked if Lab reference values of patch data stored in the memory 812 fall within the condition range (S1403).

Figure 17:
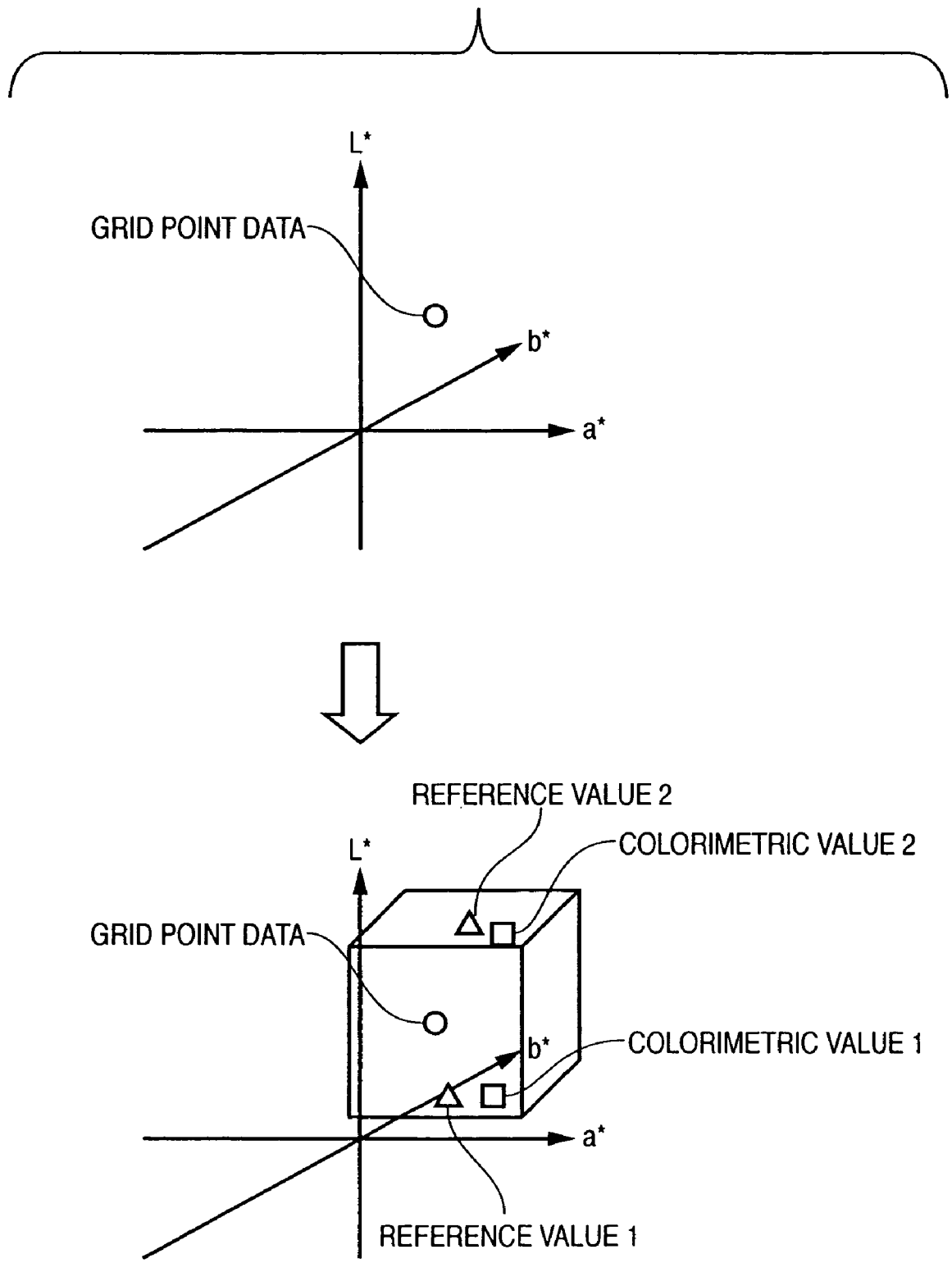
FIG. 17 is a view for explaining the relationship among Lab grid points, a condition range, Lab reference values, and calorimetric values.

FIG. 17 is a view for explaining the relationship among the Lab grid point data, condition range, Lab reference values, and colorimetric values.

If there are Lab reference values included in the condition range, differences D between these Lab reference values and corresponding calorimetric values are calculated (S1406), and the average of the differences D is calculated (S1407). In the example of FIG. 17, since two Lab reference values are included in the condition range, the differences from their colorimetric values are calculated, and an average value of the differences is then calculated. In this way, the same effect as in the smoothing process of the first embodiment can be obtained, and a pseudo contour can be prevented.

On the other hand, if no Lab reference values are included in the condition range, a closest Lab reference value is searched for, and a difference D between that Lab reference value and calorimetric value is calculated (S1404). Then, weighting is made according to the distance by the same method as in the first embodiment (S1405). Since a grid point which has no Lab reference value within the condition range often falls outside the color gamut, the weight may use a uniform value (e.g., ¼ or the like).

Steps S1401 to S1407 are repeated until it is determined in step S1408 that average values Da of the differences or weighted differences D·W are calculated for all the Lab grid points of the LUT.

Next, the average values Da of the differences or weighted differences D·W are applied to Lab grid point data to update the grid points (S1409), and one Lab grid point data is extracted from the updated grid points (S1410). If CMYK values corresponding to the updated grid points are known, the Lab to CMYK LUT of the destination profile can be updated. Hence, by utilizing the fact that the Lab to CMYK LUT before update, which is stored in the memory 813, is an LUT that describes conversion from Lab to CMYK, a three-dimensional linear interpolation operation is applied to the Lab value of the updated grid point to calculate a CMYK value (S1411).

Steps S1410 and S1411 are repeated until it is determined in step S1412 that the processes for all the Lab grid points of the LUT are complete. If the CMYK values of all the Lab grid points are calculated, the Lab to CMYK LUT is updated by the results (S1413).

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-200800, filed on Jul. 7, 2004, which is hereby incorporated by reference herein.

What is claimed is:

1. An image processing apparatus for generating a profile used to convert image data of an input color space into image data of an output color space via a device-independent color space, comprising:

a generator, arranged to extract grid values which are uniformly distributed in the device-independent color space and are included in a color reproductive range of the input color space smaller than the device-independent color space, and to convert the extracted grid values using first conversion data from the device-independent color space to the output color space, which is included in the profile so as to generate patch data including multi-order colors, wherein the color reproductive range corresponds to a reproductive range of an input device for generating image data to be converted using the profile;

an obtainer, arranged to obtain colorimetric values corresponding to the patch data;

a first calculator, arranged to calculate reference values of the device-independent color space corresponding to the patch data using second conversion data from the output color space to the device-independent color space, which is included in the profile;

a first updater, arranged to update grid values of the device-independent color space, which are defined in the profile, wherein each grid value is updated using a difference between a reference value closest to the grid value, and a colorimetric value corresponding to the reference value;

a second calculator, arranged to calculate output color values of the output color space corresponding to the updated grid values using the first conversion data before update; and a second updater, arranged to update the first conversion data using the updated grid values and the calculated output color values.

2. The apparatus according to claim 1, wherein the first updater updates the grid values in accordance with differences after a smoothing process.

3. A method of generating a profile used to convert image data of an input color space into image data of an output color space via a device-independent color space, comprising the steps of:

extracting grid values which are uniformly distributed in the device-independent color space and are included in a color reproductive range of the input color space smaller than the device-independent color space, wherein the color reproductive range corresponds to a reproductive range of an input device for generating image data to be converted using the profile;

converting the extracted grid values using first conversion data from the device-independent color space to the output color space, which is included in the profile so as to generate of patch data including multi-order colors;

obtaining colorimetric values corresponding to the patch data;

calculating reference values of the device-independent color space corresponding to the patch data using second conversion data from the output color space to the device-independent color space, which is included in the profile;

updating grid values of the device-independent color space, which are defined in the profile, wherein each grid value is updated using a difference between a reference value closest to the grid value, and a colorimetric value corresponding to the reference value;

calculating output color values of the output color space corresponding to the updated grid values using the first conversion data before update; and updating the first conversion data using the updated grid values and the calculated output color values, wherein at least some of the steps are performed using a computer.

4. A non-transitory computer-readable medium storing a computer-executable program for causing a computer to perform a method of generating a profile used to convert image data of an input color space into image data of an output color space via a device-independent color space, the method comprising the steps of:

extracting grid values which are uniformly distributed in the device-independent color space and are included in a color reproductive range of the input color space smaller than the device-independent color space, wherein the color reproductive range corresponds to a reproductive range of an input device for generating image data to be converted using the profile;

converting the extracted grid values using first conversion data from the device-independent color space to the output color space, which is included in the profile so as to generate patch data including multi-order colors;

obtaining colorimetric values corresponding to the patch data;

calculating reference values of the device-independent color space corresponding to the patch data using second conversion data from the output color space to the device-independent color space, which is included in the profile;

updating grid values of the device-independent color space, which are defined in the profile, wherein each grid value is updated using a difference between a reference value closest to the grid value, and a colorimetric value corresponding to the reference value;

calculating output color values of the output color space corresponding to the updated grid values using the first conversion data before update; and updating the first conversion data using the updated grid values and the calculated output color values.

5. An image processing apparatus for generating a profile used to convert image data of an input color space into image data of an output color space via a device-independent color space, comprising:

a generator, arranged to extract grid values which are uniformly distributed in the device-independent color space and are included in a color reproductive range of the input color space smaller than the device-independent color space, and to convert the extracted grid values using first conversion data from the device-independent color space to the output color space, which is included in the profile so as to generate patch data including multi-order colors, wherein the color reproductive range corresponds to a reproductive range of an input device for generating image data to be converted using the profile;

an obtainer, arranged to obtain colorimetric values corresponding to the patch data;

a first calculator, arranged to calculate reference values of the device-independent color space corresponding to the patch data using second conversion data from the output color space to the device-independent color space, which is included in the profile;

a first updater, arranged to update grid values of the device-independent color space, which are defined in the profile, wherein each grid value is updated by an average value of differences between the reference values present in the vicinity of the grid value, and the colorimetric values corresponding to the reference values;

a second calculator, arranged to calculate output color values of the output color space corresponding to the updated grid values using the first conversion data before update; and a second updater, arranged to update the first conversion data using the updated grid values and the calculated output color values.

6. The apparatus according to claim 5, wherein the first updater updates the grid values in accordance with differences after a smoothing process.

7. A method of generating a profile used to convert image data of an input color space into image data of an output color space via a device-independent color space, comprising the steps of:

extracting grid values which are uniformly distributed in the device independent color space and are included in a color reproductive range of the input color space smaller than the device independent color space, wherein the color reproductive range corresponds to a reproductive range of an input device for generating image data to be converted using the profile;

converting the extracted grid values using first conversion data from the device independent color space to the output color space, which is included in the profile so as to generate patch data including multi-order colors;

obtaining colorimetric values corresponding to the patch data;

calculating reference values of the device-independent color space corresponding to the patch data using second conversion data from the output color space to the device-independent color space, which is included in the profile;

updating grid values of the device-independent color space, which are defined in the profile, wherein each grid value is updated by an average value of differences between the reference values present in the vicinity of the grid value, and the colorimetric values corresponding to the reference values;

calculating output color values of the output color space corresponding to the updated grid values using the first conversion data before update; and updating the first conversion data using the updated grid values and the calculated output color values, wherein at least some of the steps are performed using a computer.

8. A non-transitory computer-readable medium storing a computer-executable program for causing a computer to perform a method of generating a profile used to convert image data of an input color space into image data of an output color space via a device-independent color space, the method comprising the steps of:

extracting grid values which are uniformly distributed in the device independent color space and are included in a color reproductive range of the input color space smaller than the device independent color space, wherein the color reproductive range corresponds to a reproductive range of an input device for generating image data to be converted using the profile;

converting the extracted grid values using first conversion data from the device independent color space to the output color space, which is included in the profile so as to generate patch data including multi order colors;

obtaining colorimetric values corresponding to the patch data;

calculating reference values of the device-independent color space corresponding to the patch data using second conversion data from the output color space to the device-independent color space, which is included in the profile;

updating grid values of the device-independent color space, which are defined in the profile, wherein each grid value is updated by an average value of differences between the reference values present in the vicinity of the grid value, and the colorimetric values corresponding to the reference values;

calculating output color values of the output color space corresponding to the updated grid values using the first conversion data before update; and updating the first conversion data using the updated grid values and the calculated output color values.

9. An image processing apparatus, comprising:

a generator, arranged to select grid values which are uniformly distributed in a device-independent color space and are included in a color reproductive range of an input color space smaller than the device-independent color space, and to convert the selected grid values using conversion data from the input color space to an output color space via the device-independent color space, which is included in a profile so as to generate patch data including multi-order colors, wherein the color reproductive range corresponds to a reproductive range of an input device for generating image data to be converted using the profile;

an obtainer, arranged to obtain colorimetric data corresponding to the patch data;

a first calculator, arranged to calculate reference data of the device-independent color space corresponding to the patch data;

a first updater, arranged to update grid values of the device-independent color space, which are defined in the profile, wherein each grid value is updated using a difference between a reference value closest to the grid value, and a colorimetric value corresponding to the reference value;

a second calculator, arranged to calculate output color values of the output color space corresponding to the updated grid values using the conversion data before update; and a second updater, arranged to update the conversion data using the updated grid values and the calculated output color values.

10. The apparatus according to claim 9, wherein the generator can use the color reproductive range corresponding to a reproductive range of a print standard profile instead of the reproductive range of the input device.

11. The apparatus according to claim 9, wherein the color reproductive range is a reproductive range of an sRGB color space.

12. An image processing method, comprising the steps of:

selecting grid values which are uniformly distributed in a device-independent color space and are included in a color reproductive range of an input color space smaller than the device-independent color space, wherein the color reproductive range corresponds to a reproduction range of an input device for generating image data to be converted using a profile;

converting the selected grid values using conversion data from the input color space to an output color space via the device-independent color space, which is included in the profile so as to generate patch data including multi-order colors;

obtaining colorimetric data corresponding to the patch data;

calculating reference data of the device-independent color space corresponding to the patch data;

updating grid values of the device-independent color space, which are defined in the profile, wherein each grid value is updated using a difference between a reference value closest to the grid value, and the colorimetric value corresponding to the reference value;

calculating output color values of the output color space corresponding to the updated grid values using the conversion data before update; and updating the conversion data using the updated grid values and the calculated output color values, wherein at least some of the steps are performed using a computer.

13. A non-transitory computer-readable medium storing a computer-executable program for causing a computer to perform an image processing method, the method comprising the steps of:

selecting grid values which are uniformly distributed in a device-independent color space and are included in a color reproductive range of an input color space smaller than the device-independent color space, wherein the color reproductive range corresponds to a reproductive range of an input device for generating image data to be converted using a profile;

converting the selected grid values using conversion data from the input color space to an output color space via the device-independent color space, which is included in the profile so as to generate patch data including multi-order colors;

obtaining colorimetric data corresponding to the patch data;

calculating reference data of the device-independent color space corresponding to the patch data;

updating grid values of the device-independent color space, which are defined in the profile, wherein each grid value is updated using a difference between a reference value closest to the grid value, and a colorimetric value corresponding to the reference value;

calculating output color values of the output color space corresponding to the updated grid values using the conversion data before update; and updating the conversion data using the updated grid values and the calculated output color values.

14. An image processing apparatus, comprising:

a generator, arranged to select grid values which are uniformly distributed in a device independent color space and are included in a color reproductive range of an input color space smaller than the device independent color space, and to convert the selected grid values using conversion data from the input color space to an output color space via the device independent color space, which is included in a profile so as to generate patch data including multi-order colors, wherein the color reproductive range corresponds to a reproductive range of an input device for generating image data to be converted using the profile;

an obtainer, arranged to obtain colorimetric data corresponding to the patch data;

a first calculator, arranged to calculate reference data of the device-independent color space corresponding to the patch data;

a first updater, arranged to update grid values of the device-independent color space, which are defined in the profile, wherein each grid value is updated by an average value of differences between the reference values present in the vicinity of the grid value, and the colorimetric values corresponding to the reference values;

a second calculator, arranged to calculate output color values of the output color space corresponding to the updated grid values using the conversion data before update; and a second updater, arranged to update the conversion data using the updated grid values and the calculated output color values.

15. An image processing method, comprising the steps of:

selecting grid values which are uniformly distributed in a device independent color space and are included in a color reproductive range of an input color space smaller than the device independent color space, wherein the color reproductive range corresponds to a reproduction range of an input device for generating image data to be converted using a profile;

converting the selected grid values using conversion data from the input color space to an output color space via the device independent color space, which is included in the profile so as to generate patch data including multi-order colors;

obtaining colorimetric data corresponding to the patch data;

calculating reference data of the device-independent color space corresponding to the patch data;

updating grid values of the device-independent color space, which are defined in the profile, wherein each grid value is updated by an average value of differences between the reference values present in the vicinity of the grid value, and the colorimetric values corresponding to the reference values;

calculating output color values of the output color space corresponding to the updated grid values using the conversion data before update; and updating the conversion data using the updated grid values and the calculated output color values, wherein at least some of the steps are performed using a computer.

16. A non-transitory computer-readable medium storing a computer-executable program for causing a computer to perform an image processing method, the method comprising the steps of:

selecting grid values which are uniformly distributed in a device independent color space and are included in a color reproductive range of an input color space smaller than the device independent color space, wherein the color reproductive range corresponds to a reproduction range of an input device for generating image data to be converted using a profile;

converting the selected grid values using conversion data from the input color space to an output color space via the device independent color space, which is included in the profile so as to generate patch data including multi-order colors;

obtaining colorimetric data corresponding to the patch data;

calculating reference data of the device-independent color space corresponding to the patch data;

updating grid values of the device-independent color space, which are defined in the profile, wherein each grid value is updated by an average value of differences between the reference values present in the vicinity of the grid value, and the colorimetric values corresponding to the reference values;

calculating output color values of the output color space corresponding to the updated grid values using the conversion data before update; and updating the conversion data using the updated grid values and the calculated output color values.

* * * * *